United States Patent
Caminada

[19]

[11] Patent Number: 5,890,658
[45] Date of Patent: Apr. 6, 1999

[54] NOZZLE CLOSING VALVE, AS WELL AS PRESSURE ATOMIZER NOZZLE HAVING SUCH A NOZZLE CLOSING VALVE

[75] Inventor: Marcel Caminada, Niederglatt, Switzerland

[73] Assignee: Satronic AG, Dielsdorf, Switzerland

[21] Appl. No.: 841,569

[22] Filed: Apr. 30, 1997

[30] Foreign Application Priority Data

Mar. 5, 1996 [CH] Switzerland .......................... 1139/96

[51] Int. Cl.[6] ..................................... B05B 1/30
[52] U.S. Cl. ................. 239/533.2; 239/575; 239/590
[58] Field of Search ............... 239/590, 590.8, 239/570, 533.2, 533.9, 533.12, 575

[56] References Cited

U.S. PATENT DOCUMENTS

| | | | |
|---|---|---|---|
| 2,144,862 | 1/1939 | Truxell | 239/570 |
| 2,513,720 | 7/1950 | Hallinan | 239/533.2 |
| 2,625,437 | 1/1953 | Huntington | 239/533.2 |
| 3,223,331 | 12/1965 | Baker | 239/533.2 |
| 3,297,260 | 1/1967 | Barlow | 239/533.13 |
| 3,948,285 | 4/1976 | Flynn . | |
| 4,167,247 | 9/1979 | Sons et al. | 239/570 |
| 4,555,719 | 11/1985 | Arway et al. | 239/570 |

FOREIGN PATENT DOCUMENTS

| | | |
|---|---|---|
| 0291991 | 11/1988 | European Pat. Off. . |
| 3308153 | 9/1984 | Germany . |

*Primary Examiner*—Kevin Weldon
*Attorney, Agent, or Firm*—Oblon, Spivak, McClelland, Maier & Neustadt, P.C.

[57] ABSTRACT

A nozzle closing valve, particularly for a pressure atomizer nozzle of an oil burner, comprises an inlet side with an inlet passage, an outlet side with an outlet passage, a valve seat located between the inlet passage and the outlet passage, as well as a shutoff member. The shutoff member is sealingly pressed onto the valve seat by way of a first spring located behind the shutoff member and rises from the valve seat counter to the force of the first spring when a predetermined pressure is reached in the inlet passage. A maximum sealing action with easy manufacturability and a particularly compact structure are achieved in that the shutoff member is constructed as a membrane; the first spring has an essentially linear spring characteristic; the first spring is housed in a spring chamber, which is constructed as a space open on one side and whose sole opening is sealingly closed by the membrane; and the first spring and the spring chamber are located on the inlet side of the nozzle closing valve.

27 Claims, 4 Drawing Sheets

NOZZLE CLOSING VALVE, AS WELL AS PRESSURE ATOMIZER NOZZLE HAVING SUCH A NOZZLE CLOSING VALVE

BACKGROUND OF THE INVENTION

1. Field of the Invention

The present invention relates to the field of combustion engineering. The invention concerns a nozzle closing valve, particularly for a pressure atomizer nozzle of an oil burner, having an inlet side with an inlet passage, an outlet side with an outlet passage, a valve seat located between the inlet passage and the outlet passage, and a shutoff member. The shutoff member is pressed by means of a first spring located behind the shutoff member in a sealing member onto the valve seat and lifts from the valve seat counter to the force of the first spring when a predetermined pressure is reached in the inlet passage.

The present invention also relates to a pressure atomizer nozzle for an oil burner having a nozzle casing, which surrounds an inner space in the form of a blind hole. The inner space is connected in the base region of the blind hole by a nozzle bore to the outer space.

2. Discussion of the Background

A related nozzle closing valve and pressure atomizer nozzle are, e.g., illustrated in applicant's DE-Al-33 08 153 document.

In oil operated heating installations, in which the heating oil to be burnt is injected under a pressure of several (approximately 5) bar by a pressure atomizer nozzle into the combustion chamber, if no special pre-cautions are taken, on switching off the burner there can be a jet-like discharge or dripping of oil out of the pressure atomizer nozzle. In the shutdown phase and subsequent starting phase, such dripping leads to an excess of heating oil in the combustion chamber, which is rendered noticeable in the form of unburnt hydrocarbons in the flue gas and significantly deteriorates the emission values of the heating installation. The same undesired effects occur if, due to a heating of the oil in the feed line to the nozzle, there is a volume expansion leading to a pressure build-up in the line and to a discharge of oil from the nozzle opening.

Thus, in the aforementioned document it has already been proposed to equip the pressure atomizer nozzle of a heating installation with an automatically switchable shutoff valve. Such a shutoff valve, which operates with a resiliently pretensioned ball as the shutoff device and which is directly inserted in the nozzle, in the case of a significant pressure drop such as occurs on switching off, in the oil supply line stops the direct oil flow to the nozzle, so that the oil volumes present in the supply line between the solenoid valve and the nozzle can no longer pass out of the nozzle following switching off.

In the related shutoff valve the valve ball, which rests directly on a metal valve seat, is pretensioned by a membrane-like elastic spring, which can spring backwards and forwards between two end positions and therefore has an extreme nonlinear characteristic. Through the use of the elastic spring it is ensured that the valve opens, e.g., at an opening pressure of 7 to 9 bar, but only closes again at a closing pressure of normally 4 bar. This hysteresis in the valve behavior has the advantage that, if the opening pressure on starting up the oil pump is once briefly reached and the valve opens, subsequently during a much lower operating pressure injection can take place, so that the oil pump efficiency is significantly improved.

However, it is problematical in the case of such a related valve that in practice it is extremely difficult to manufacture an elastic spring with a precisely predetermined spring characteristic, particularly as the spring only has a diameter of a few millimeters. In addition, as a result of the cooperation between the metal valve ball and the metal valve seat it is difficult to achieve an adequate sealing of the valve.

In the case of a compressed air oil atomizer nozzle, a valve located in the nozzle has been proposed, in which the shutoff member is constituted by a membrane or diaphragm pretensioned by a linear coil spring (EP-Al-566 855). The coil spring is housed in a spring chamber, which is admittedly sealed on one side by the membrane, but on the other side is connected to the nozzle opening through a relief opening. Thus, during operation oil can penetrate the spring chamber and, as the spring chamber is positioned behind the valve, can pass out of the nozzle after switching off However, in practice little oil enters the spring chamber. This is linked with the fact that in the case of the compressed air oil atomizer nozzle of EP-Al-566 855, other than with the pressure atomizer nozzle operating without compressed air of DE-Al-33 08 153, as a result of the compressed air a suction action is produced in the vicinity of the nozzle opening, which possibly immediately sucks off the oil entering th e spring chamber.

Figure 1:
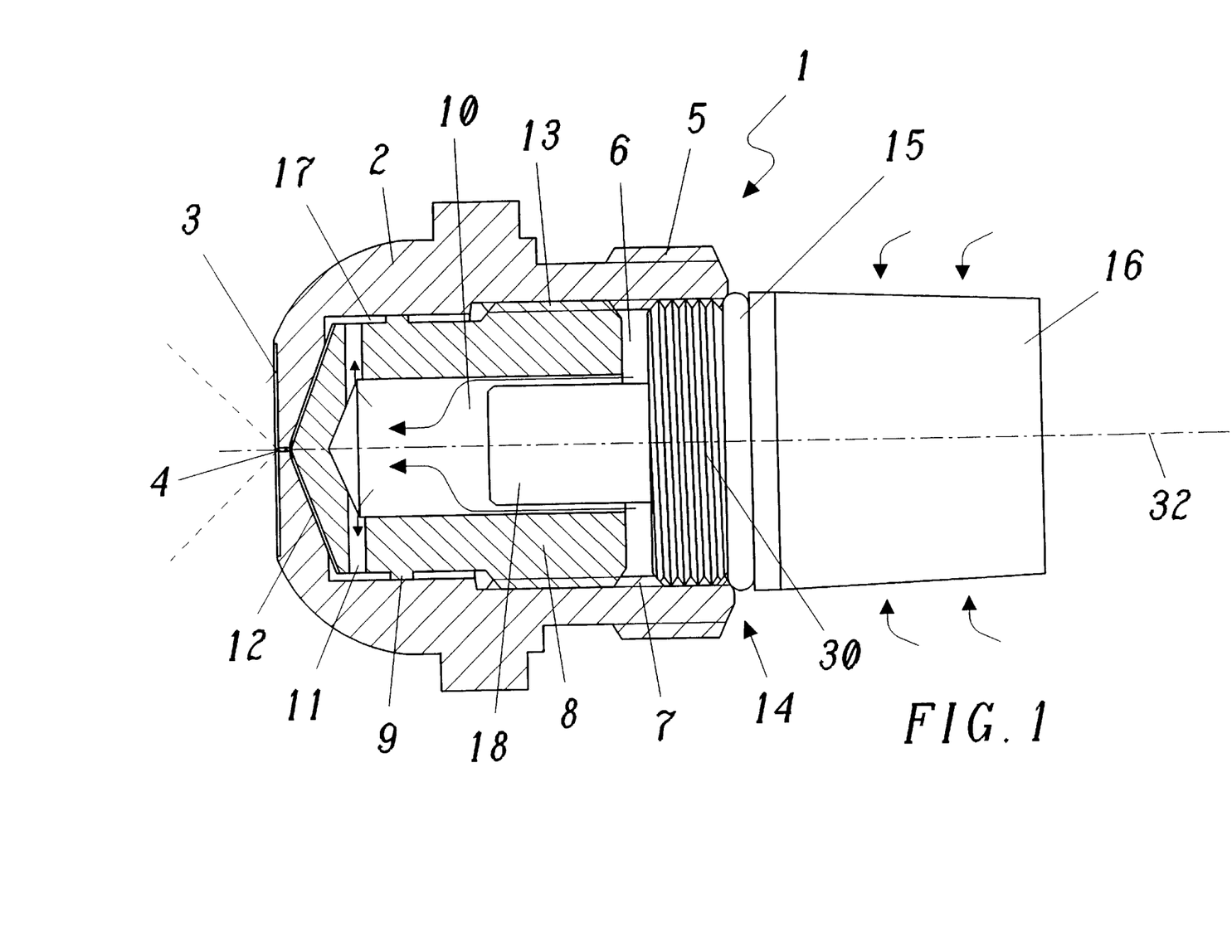
FIG. 1 is a partial longitudinal section of the fitting of an exemplified valve according to the earlier-dated European patent application 96810122.0 in a pressure atomizer nozzle.
Figure 2:
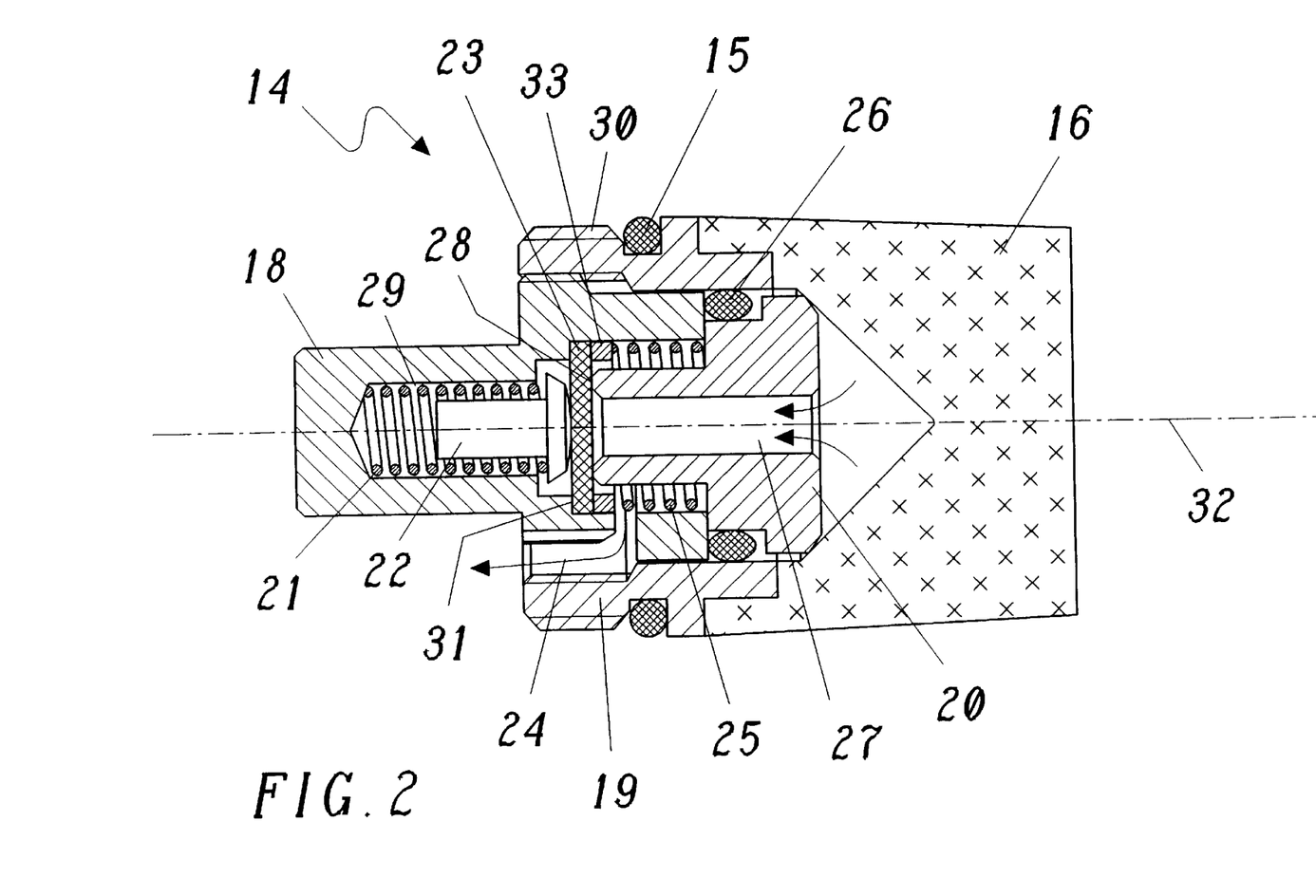
FIG. 2 is a longitudinal section of the internal structure of the valve of FIG. 1.

In order to solve these problems in an earlier-dated, not previously published application, namely European patent application 96810122.0, the applicant has already proposed a pressure atomizer nozzle with a nozzle closing valve, as shown in embodiments according to FIGS. 1 and 2. The pressure atomizer nozzle 1 according to FIG. 1 essentially comprises a nozzle casing 2 with a blind hole-like inner space 6. The nozzle casing 2 is flattened on the outlet side with a nozzle face 3, in whose center is located a nozzle bore 4. The nozzle bore 4 from which the oil flows out with a pressure of several bar, connects the inner space 6 of the nozzle 1 to the outer space. In the inner space 6 is placed a cylindrical conical insert 8, which is adapted with its conical tip to the hollow conical base of the inner space 6. Below the conical tip the external diameter of the conical insert 8 is reduced to a narrow, circular, circumferential bead 9, whose external diameter is adapted to the internal diameter of the inner space 6 and assumes the function of a type of filter in order to ensure that chips and the like do not reach the nozzle opening. As a result of the reduced diameter, between the conical insert 8 and the wall of the inner space 6, in the front part of the nozzle a circular overflow chamber 17 is formed. The overflow chamber 17 is connected to the nozzle bore 4 by helical grooves 12 made on the conical tip of the conical insert 8.

In the interior of the conical insert 8 is a blind hole 10, which extends from the rear (right-hand) end into the vicinity of the conical tip and is connected by one or more outlet passages 11 to the overflow chamber 17. The conical insert 8 carries on the rear (right-hand) end an external thread 13 by means of which it can be screwed into a corresponding internal thread 7 in the inner space 6. A nozzle closing valve 14 is positioned upstream of the conical insert 8 in the flow direction. The nozzle closing valve 14 shown in side view is also screwed by means of an external thread 30 into the nozzle casing 2 and is sealed by an O-ring 15 against the casing 2. On the inlet side the nozzle closing valve 14 is connected to a filter 16, which is preferably made from sintered metal. The nozzle closing valve 14 projects with a pin-like extension into the blind hole 10 of the conical insert 8. The pressure atomizer nozzle 1 with the screwed in nozzle closing valve 14 can in turn be screwed by means of an external thread 5 into a not shown oil preheater or the like.

In operation, the oil, which enters on the right-hand side through the filter 16 into the nozzle closing valve 14 is allowed to pass into the inner space 6 through a not shown outlet (f.24 in FIG. 2) not shown in FIG. 1, in the area behind the screw-in-thread with the valve open. It flows from there in the direction of the arrows through the outlet passages 11 into the overflow chamber 17 and from there via the helical grooves 12 into the nozzle bore 4, from where it is discharged in the form of an atomizing cone (shown in broken line form) into the outer space (combustion chamber).

The internal construction of the nozzle closing valve 14 of FIG. 1 is shown in longitudinal section in FIG. 2. The nozzle closing valve 14 is assembled from substantially rotationally symmetrical components 16, 18, 19, 20, 22, 23 arranged concentrically to a valve axis 32. The components inter alia comprise a cylindrical ring-shaped valve casing 19, which is terminated on one side by the fixed fitted filter 16. In the valve casing 19 is inserted an inner part 20, which contains an inlet passage 27 in the form of a concentric through-hole. The inner part 20 is supported on the inlet side on the filter 16 and on the outlet side is equipped with a valve seat 28, which surrounds in annular manner the outlet of the inlet passage 27. Into the valve casing 19 is also screwed a valve screw 18, which contains a spring chamber 29, a membrane seat 31 connected thereto and an outlet 24 projecting laterally upstream of the membrane seat 31 and fixes in the screwed in state the inner part 20 in the valve casing 19. As mentioned hereinbefore, the valve casing 19 has an external thread 30 with which it can be screwed into the pressure atomizer nozzle 1.

The shutoff member of the nozzle closing valve 14 is constructed as a diaphragm or membrane 23. The elastic membrane 23, which is inserted in the membrane seat 31, is sealingly pressed onto the valve seat 28 by a first spring 21 positioned behind the membrane 23. Counter to the force of the first spring 21 it only rises from the valve seat 28 when a predetermined pressure, i.e. the opening pressure, is reached in the inlet passage 27. The first spring 21 is preferably constructed as a coil spring and has a substantially linear spring characteristic. The first spring 21 acts on a thrust bolt 22, which in turn exerts pressure on the membrane 23 with a convex face.

The first spring 21 is housed in the spring chamber 29, which is constructed as a space (blind hole) open on one side and whose sole opening is sealingly closed by the membrane 23. The spring chamber 29 contains a compressible medium, which on opening the valve can be slightly compressed by the deforming membrane 23. As a result of its sealed nature no oil can penetrate it during operation, so that it does not constitute a harmful volume with respect to dripping. The rear marginal area of the membrane 23 rests on the membrane seat and is pressed by means of a second spring 25, also preferably a coil spring, against the membrane seat 31. This ensures that the membrane 23 always sealingly rests on the membrane seat 31. The second spring 25 is housed in an annular hollow space, which is formed between the front (left-hand) portion of the inner part 20 and the rear (right-hand) portion of the valve screw 18.

Laterally upstream of the membrane 23 in the flow direction an outlet 24 passes out of the valve screw 18 and at the front passes out of the valve casing 19. The inner part 20 is sealed against the valve casing 19 with a further O-ring 26. Coming from the right-hand side, the oil passes through the filter 16 into the inlet passage 27 and from there presses in the membrane 23, namely on a surface bordered by the valve seat 28. With rising pressure the membrane 23 bends to the left and presses the thrust bolt 22 to the left and compresses the first spring 21. On reaching the opening pressure of, e.g., 5 to 7 bar, the membrane 23 lifts from the valve seat 28, so that the oil can fill the space of the second spring 25. The oil now presses on a larger surface, bordered by the membrane seat 31, onto the membrane, so that a lower pressure is adequate in order to compensate the same spring force of the first spring 21. Therefore the oil pressure keeping open the valve closing valve 14 is much lower than the opening pressure. With the membrane 23 raised, the oil then flows out of the outlet 24 into the inner space 6 of the pressure atomizer nozzle 1, as described hereinbefore.

Preferably, between the membrane 23 and the second spring 25 is provided a metal collar 33, which uniformly distributes the pressure of the second spring 25 onto the edge of the membrane 23 and therefore improves the seating of the membrane 23 in the valve and the sealing action relative to the spring chamber 29. Preferably, the thrust bolt 22 has a diameter-enlarged, convexly rounded head, which on compressing the thrust bolt 22 in the opening direction of the valve rests on a step formed in the valve screw 18 and therefore limits the displacement path of the thrust bolt 22, i.e. the valve clearance.

The pressure atomizer nozzle with nozzle closing valve according to the prior application and FIGS. 1 and 2, as a result of its construction, leads to significant advantages compared with the related art. However, the range of use of the nozzle closing valve 14 is limited by the fact that the valve with the part of the valve screw 18 projecting out of the valve casing 19 penetrates far into the blind hole 1 of the conical insert 8. Thus, the valve requires additional space, which leads to corresponding limitations with respect to the design of the conical insert 8.

SUMMARY OF THE INVENTION

An object of the invention is therefore to provide a valve, which on the one hand in the same way as the valve of the prior application can be easily manufactured with reproducible valve characteristics, has the desired hysteresis in the valve characteristics, and only limited harmful volumes in which dripping oil can collect and which is on the other hand characterized by a significantly reduced space requirement.

In the case of a valve of the aforementioned type, the shutoff member is constructed as a membrane, the first spring has a substantially linear spring characteristic, the first spring is housed in a spring chamber, which is constructed as a space open on one side and whose sole opening is closed in a sealing manner by the membrane and the first spring and the spring chamber are located on the inlet side of the nozzle closing valve.

In conjunction with the metal valve seat, the elastic membrane leads to excellent valve sealing. The combination of the membrane and the linear spring leads to the desired hysteresis for the following reason. The membrane seat, i.e. the marginal area on which the membrane rests, surrounds a much larger surface than the valve seat, against which the membrane is sealingly pressed by the first spring. For as long as the valve is closed, the oil pressure acts on the smaller membrane surface surrounding the valve seat. If the valve opens, the pressure acts on a larger membrane surface including the area within the valve seat. Thus, on the first spring acts a force higher in the ratio of the two surfaces, so that the membrane can be kept with a reduced pressure in the open position. The construction of the spring chamber as a space closed by the membrane ensures that the spring chamber is only filled with a compressible medium, but not with oil, which could pass out of the nozzle after closing the valve. The arrangement of the spring chamber with the first spring on the inlet side, which is made possible by a flow direction reversed as compared with the valve of the prior application, significantly shortens the valve length, so that with unchanged external dimensions of the pressure atomizer nozzle more space remains available for the construction of the conical insert or other means.

A first, preferred embodiment of the valve according to the invention is characterized in that the opening of the spring chamber is bordered by a circumferential membrane seat, on which the membrane rests with its rear marginal area, and that the membrane is pressed by means of a second spring against the membrane seat. Thus, even in the case of slight, unavoidable tolerances of the membrane and the membrane seat a reliable sealing is ensured. In order to render uniform the pressure of the second spring on the membrane, according to a preferred development between the membrane and the second spring is positioned a preferably metal collar.

A second, preferred embodiment of the valve according to the invention is characterized in that the first spring is constructed as a coil spring and acts on a thrust bolt, which in turn exerts by one face a pressure on the membrane and the thrust bolt face has a convex shape. The coil spring can be manufactured very easily with a very precise spring characteristic. By its convex face, the thrust bolt introduces the spring force areally into the membrane and avoids punctiform loads, which could damage the membrane. Another preferred embodiment of the valve according to the invention is characterized in that the nozzle closing valve is assembled from substantially rotationally symmetrical components arranged concentrically to a valve axis. The components include a cylindrical ring-shaped valve casing, which is closed on one side by a fixed fitted filter, an inner part is inserted in the valve casing which contains the inlet passage as a lateral recess, is supported on the filter on the inlet side and contains the spring chamber and the membrane seat connected thereto. In the valve casing is screwed a valve screw, which contains the outlet passage as a central bore, is provided on the inlet side with the valve seat and in the screwed in state fixes the inner part in the valve casing. The valve casing has an external thread with which it can be screwed into the pressure atomizer nozzle. As a result of this construction the valve can easily be assembled and maintained, while being easily fittable and removable with respect to the nozzle.

The pressure atomizer nozzle according to the invention for an oil burner has a nozzle casing, which surrounds an inner space in the form of a blind hole. The inner space is connected in the base region of the blind hole by a nozzle bore to the outer space, and in the inner space is inserted a nozzle closing valve according to the invention.

According to a preferred embodiment the nozzle closing valve is screwed into the nozzle casing and is sealed by a second O-ring against the nozzle casing.

The present invention therefore provides for a nozzle closing valve which comprises an inlet side having an inlet passage; an outlet side having an outlet passage; a valve seat located between the inlet passage and the outlet passage; and a shutoff member which is pressed by means of a first spring positioned behind the shutoff member in a sealing manner onto the valve seat and rises from the valve seat counter to a force of the first spring when a predetermined pressure is reached in the inlet passage.

The shutoff member is constructed as a membrane. The first spring has a substantially linear spring characteristic and is housed in a spring chamber. The spring chamber is constructed as a space open on one side with the opening being sealingly closed by the membrane. The first spring and the spring chamber are located on the inlet side of the nozzle closing valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 3:
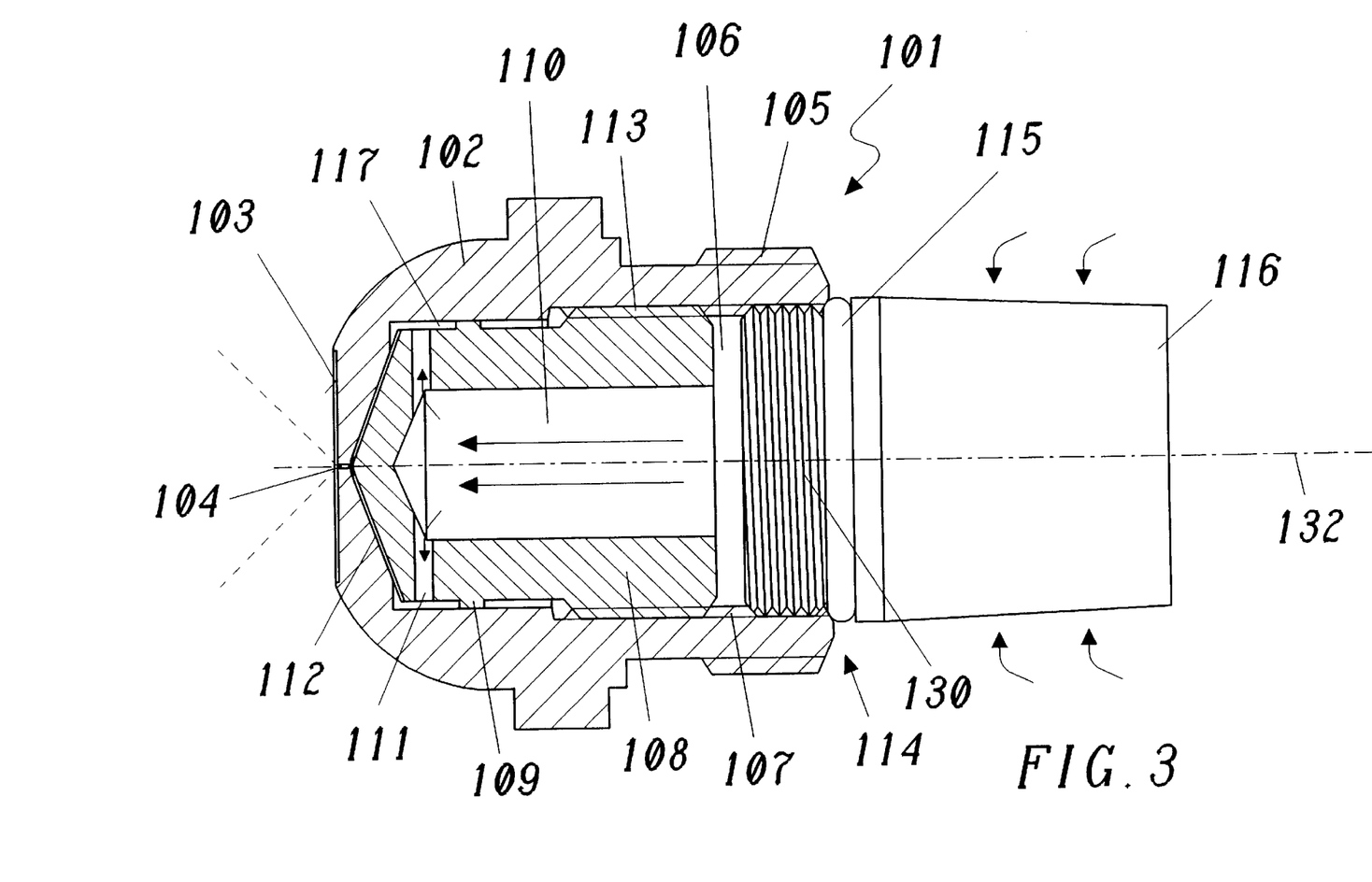
FIG. 3 is a representation comparable to FIG. 1, of the fitting of an exemplified valve according to the present invention into a pressure atomizer nozzle.

Referring now to the drawings, wherein like reference numerals designate identical or corresponding parts throughout the several views, FIG. 3 shows a preferred embodiment of a pressure atomizer nozzle with a fitted nozzle closing valve according to the invention intended for an oil burner. The pressure atomizer nozzle 101 has substantially the same structure as the nozzle described in conjunction with FIG. 1 and comprises a nozzle casing 102 with a blind bore-like inner space 106. On the outlet side the nozzle casing 102 is flattened with a nozzle face 103, in whose center is located a nozzle bore 104. The nozzle bore 104, from which the oil passes out with a pressure of several bar, links the nozzle inner space 106 with the outer space. In the inner space 106 is inserted a cylindrical, conical insert 108, whose conical tip is adapted to the hollow conical base of the inner space 106. Below the conical tip the conical insert 108 undergoes a reduction of its external diameter so as to give a narrow, annular circumferential bead 109, whose external diameter is adapted to the internal diameter of the inner space 106 and which takes over the function of a type of filter to prevent chips and the like from reaching the nozzle opening. Due to the reduced diameter, in the front part of the nozzle, between the conical insert 108 and the wall of the inner space 106, is formed an annular overflow chamber 117, which is connected to the nozzle bore 104 via helical grooves 112 formed on the conical tip of the conical insert 108.

In its interior the conical insert 108 can have a blind hole 110, which extends from the rear (right-hand) end into the vicinity of the conical tip and is connected by one or more outlet passages 111 with the overflow chamber 117. In place of the blind hole 110, the interior of the conical insert 108 can also have other components. The conical insert 108 carries on the rear (right-hand) end an external thread 113 by means of which it can be screwed into a corresponding internal thread 107 in the inner space 106. The nozzle closing valve 114 according to the invention is placed upstream of the conical insert in the flow direction. The nozzle closing valve 114 shown in side view is screwed by means of an external thread 130 into the nozzle casing 102 and is sealed by an O-ring 115 against the casing 102. On the inlet side the nozzle closing valve 114 is connected to a filter 116, which is preferably made from sintered metal. Unlike in FIG. 1, the nozzle closing valve 114 does not project with a pin-like extension into the blind hole 110 of the conical insert 108 and instead terminates upstream of the inlet side of the conical insert 108. Thus, the entire inner space of the conical insert 108 or the inner space 106 in the nozzle casing 102 is freely available.

Figure 4:
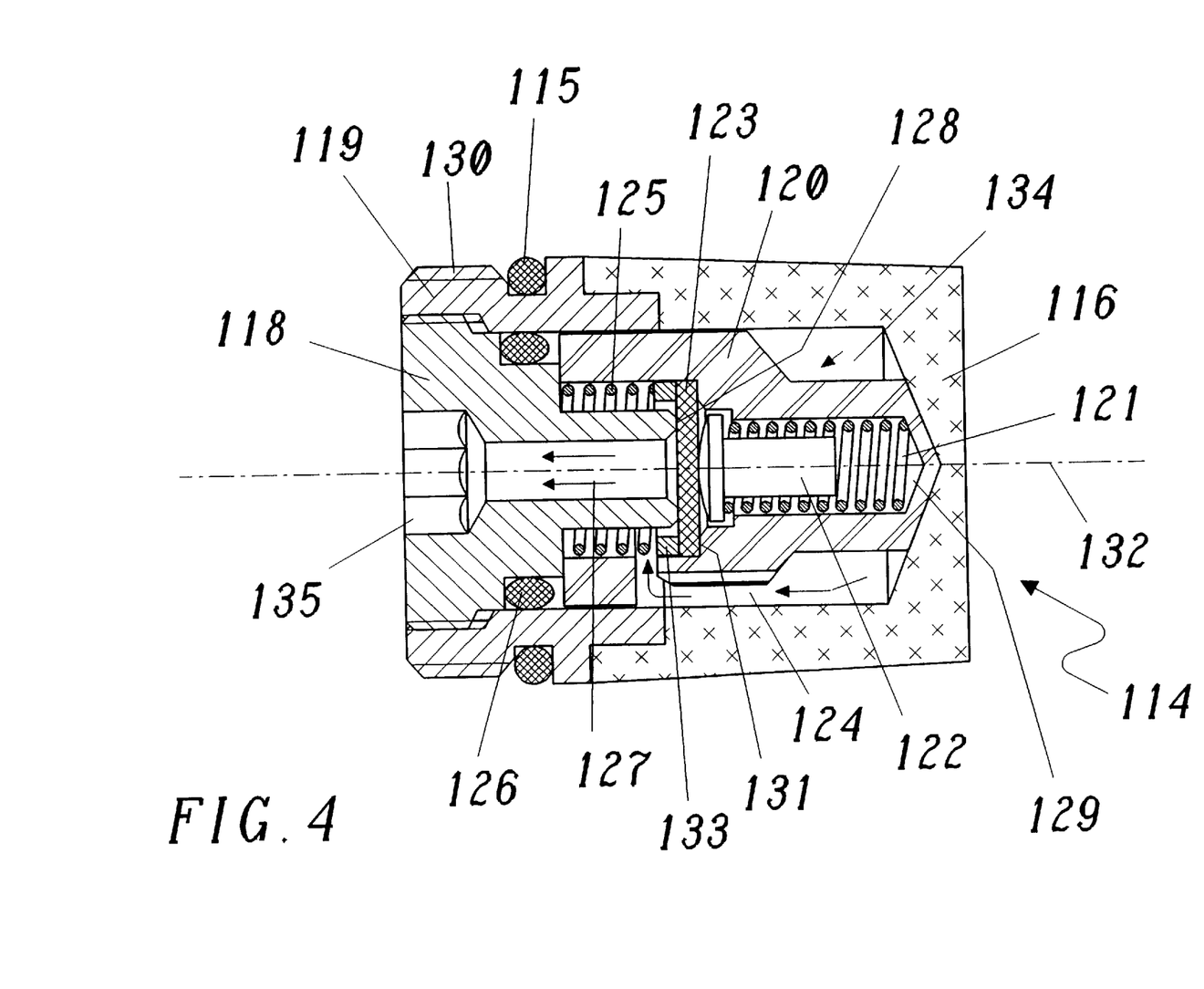
FIG. 4 is longitudinal section of the internal structure of the valve according to FIG. 3.

The internal structure of the exemplified nozzle closing valve 114 of FIG. 3 is shown in longitudinal sectional form in FIG. 4. The nozzle closing valve 114 comprises rotationally symmetrical components 116, 118, 119, 120, 122, 123 arranged concentrically with respect to a valve axis 132. The components inter alia comprise a cylindrical ring-shaped valve casing 119, which is terminated on one side by the fixed fitted (e.g. pressed on) filter 116. In the valve casing 119 is inserted an inner part 120, which forms with a tapered tip within the filter an inflow chamber 134 and laterally contains an inlet passage 124 in the form of a recess. On the inlet side the inner part 120 is supported on the filter 116 and contains a spring chamber 129 and a membrane seat 131 connected thereto and which receives and retains a membrane 123.

In the valve casing 119 is also screwed a valve screw 118, which has a central outlet passage 127 and a valve seat 128 located at the start of the outlet passage. In the screwed in state the valve screw 118 fixes the inner part 120 in the valve casing 119. For screwing in purposes, a hexagonal recess 135 is fitted to the outlet-side end of the outlet channel 127. It is also conceivable within the scope of the invention for the part 118 not to be screwed in as a valve screw, but instead to be pressed in as a pressing part or otherwise fixed in the valve casing. As stated hereinbefore, the valve casing 119 has an external thread 130 with which it can be screwed into the pressure atomizer nozzle 101.

The shutoff member of the nozzle closing valve 114 is constructed as a membrane or diaphragm 123. The elastic membrane 123, which is inserted in the membrane seat 131, is pressed by means of a first spring 121 located on the inlet side of the valve and upstream of the membrane 123, in a sealing manner onto the valve seat 128. It only rises from the valve seat 128 counter to the force of the first spring 121 if a predetermined pressure, i.e. the opening pressure is reached in the inlet passage 124. The first spring 121 is preferably constructed as a coil spring and has a substantially linear spring characteristic. It acts on a thrust bolt 122, which in turn exerts pressure on the membrane 123 with a convexly shaped face.

The first spring 121 is housed on the inlet side of the valve in the spring chamber 129 instead of on the outlet side. This advantageously obviates a part projecting to the left, as occurs in the arrangement according to FIG. 2. The spring chamber 129 is constructed as a space open on one side (blind hole), whose sole opening is sealingly closed by the membrane 123. The spring chamber 129 contains a compressible medium, which can be slightly compressed by the membrane 123 deforming it. As a result of its sealed nature during operation no oil can penetrate it, so that it does not constitute a harmful volume with respect to dripping. The front marginal region of the membrane 123 engages on the membrane seat 131 and is pressed against the membrane seat 131 by a second spring 125, located on the outlet side and preferably also a coil spring. This ensures that the membrane 123 always sealingly rests on the membrane seat 131. Between the membrane 123 and the second spring 125 a metallic collar 133 can be provided. The second spring 125 is housed in an annular hollow space formed between the front (left-hand) portion of the inner part 120 and the rear (right-hand) portion of the valve screw 118. As is apparent from a comparison of FIGS. 2 and 4, in both valves the springs 21, 25 or 121, 125, the thrust bolts 22 or 122, the membrane and membrane seat 23, 31 or 123, 131 are turned by 180°. The valve screw 18 in FIG. 2 becomes the inner part 120 in FIG. 4 and the inner part 20 becomes the valve screw 118.

In the flow direction upstream of the membrane 123, an inlet passage 124 passes laterally from the inflow chamber 134 to the space externally surrounding the valve seat 128 and which at the same time receives the second spring 125. The valve screw 118 is sealed against the valve casing 119 by a further O-ring 126. Coming from the right-hand side, the oil passes through the filter 116 into the inflow chamber 134 and from there through the inlet passage 124 into the outer space of the valve seat 128. From there it presses on the membrane 123, namely on a face which is bordered to the outside by the membrane seat 131 and to the inside by the valve seat 128.

With rising pressure the membrane 123 bends to the right and presses the thrust bolt 122 to the right and compresses the first spring 121. On reaching the opening pressure of e.g. 5 to 7 bar, the membrane 123 rises from the valve seat 128, so that oil can fill the central space of the outlet passage 127. The oil now presses on a larger surface, which is only externally bordered by the membrane seat 131, onto the membrane 123, so that a lower pressure is sufficient to compensate the same spring force of the first spring 121. Thus, the oil pressure keeping open the nozzle closing valve 114 is much lower than the opening pressure. With the membrane 123 raised, oil then flows through the outlet passage 127 into the inner space 106 of the pressure atomizer nozzle 101, as described hereinbefore. The attainable hysteresis is roughly the same as can be obtained with an arrangement according to FIG. 2.

Thus, the nozzle closing valve 114 according to the invention forms a particularly compact, easily disassemblable unit, which can be assembled and maintained simply. Fitting can take place with minor adaptations in all related valves, so that it is also possible to easily re-equip existing valves. The desired valve characteristic can be implemented in reproducible, uncritical manner by means of the coil spring. Conventional materials can be used, taking account of the necessary compression strength with regards to the membrane and also the insensitivity to oil.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A nozzle closing valve to be inserted into a nozzle casing of a pressure atomizer nozzle said nozzle closing valve comprising:

an inlet having an inlet passage;

an outlet having an outlet passage;

a valve seat located between the inlet passage and the outlet passage; and a shutoff member which is pressed by a first spring positioned behind said shutoff member in a sealing manner onto said valve seat and rises from said valve seat counter to a force of the first spring when a predetermined pressure is reached in the inlet passage;

wherein:
said shutoff member comprises a membrane;
the first spring has a substantially linear spring characteristic and is housed in a spring chamber, the spring chamber having only one opening, said opening being sealingly closed by the membrane; and wherein the first spring and the spring chamber are located in the inlet of the nozzle closing valve.

2. A nozzle closing valve according to claim 1, wherein the opening of the spring chamber is bordered by a circumferential membrane seat, on which rests a rear marginal area of the membrane, and the membrane is pressed by a second spring against the membrane seat.

3. A nozzle closing valve according to claim 2, wherein a metallic collar is positioned between the membrane and the second spring.

4. A nozzle closing valve according to claim 1, wherein the first spring comprises a coil spring and acts on a thrust bolt, the thrust bolt having an end face which exerts pressure on the membrane.

5. A nozzle closing valve according to claim 4, wherein the end face of the thrust bolt is convexly shaped.

6. A nozzle closing valve according to claim 4, wherein a displacement path of the thrust bolt is limited in a valve opening direction.

7. A nozzle closing valve according to claim 1, wherein a filter is placed at the inlet part.

8. A nozzle closing valve according to claim 7, wherein said filter is made from sintered metal.

9. A nozzle closing valve according to claim 7, wherein:
the nozzle closing valve comprises rotationally symmetrical components arranged concentrically to a valve axis, the components surrounding a cylindrical ring-shaped valve casing which is closed on one side by a fixed fitted filter;
an inner part is inserted in the valve casing, the inner part containing the inlet passage as a lateral recess, the inner part being supported on an inlet side on the filter and containing the spring chamber and the membrane seat connected thereto;
a valve screw is screwed in the valve casing, the valve screw containing the outlet passage as a central bore, the valve screw being equipped on an inlet side with the valve seat and in a screwed in state fixing the inner part in the valve casing; and
the valve casing has an external thread with which the valve casing is screwable into the pressure atomizer nozzle.

10. A nozzle closing valve according to claim 9, wherein the valve screw is sealed by an O-ring against the valve casing.

11. A nozzle closing valve according to claim 7, further comprising:
a cylindrical ring-shaped valve casing which is closed on one side by a filter;
an inner part inserted in the valve casing and containing the inlet passage, the inner part being supported on an inlet side on the filter and containing the spring chamber and the membrane seat connected thereto;
a valve screw screwed in the valve casing, the valve screw containing the outlet passage, the valve screw being equipped on an inlet side with the valve seat and in a screwed in state fixing the inner part in the valve casing; and
an external thread on the valve casing which permits the valve casing to be screwed into a pressure atomizer nozzle.

12. A pressure atomizer nozzle for an oil burner, said pressure atomizer nozzle comprising:
a nozzle casing which separates an inner space in the form of a blind hole from an outer space, said inner space being connected in a base region of the blind hole by a nozzle bore to the outer space, wherein in the inner space is inserted a nozzle closing valve to be inserted into a nozzle casing of a pressure atomizer nozzle, said nozzle closing valve comprising:
an inlet having an inlet passage;
an outlet having an outlet passage;
a valve seat located between the inlet passage and the outlet passage; and
a shutoff member which is pressed by a first spring positioned behind said shutoff member in a sealing manner onto said valve seat and rises from said valve seat counter to a force of the first spring when a predetermined pressure is reached in the inlet passage;
wherein:
said shutoff member comprises a membrane;
the first spring has a substantially linear spring characteristic and is housed in a spring chamber, the spring chamber having only one opening, said opening being sealingly closed by the membrane; and wherein the first spring and the spring chamber are located in the inlet of the nozzle closing valve.

13. A pressure atomizer nozzle according to claim 12, wherein the nozzle closing valve is screwed into the nozzle casing and is sealed against the nozzle casing with an O-ring.

14. A pressure atomizer according to claim 12, wherein between the nozzle closing valve and the nozzle bore, a conical insert is placed in the inner space of the nozzle casing.

15. A nozzle closing valve comprising:
an inlet having an inlet passage;
an outlet having an outlet passage;
a valve seat located between the inlet passage and the outlet passage; and
a shutoff member which is pressed by a first spring positioned behind said shutoff member in a sealing manner onto said valve seat and rises from said valve seat counter to a force of the first spring when a predetermined pressure is reached in the inlet passage;
wherein:
said shutoff member comprises a membrane;
the first spring has a substantially linear spring characteristic and is housed in a spring chamber, the spring chamber being constructed as a closed space with only one opening on one side, said opening being sealingly closed by the membrane;
the first spring and the spring chamber are located in the inlet part of the nozzle closing valve; and wherein the opening of the spring chamber is bordered by a circumferential membrane seat, on which rests a rear marginal area of the membrane, and the membrane is pressed by a second spring against the membrane seat.

16. A nozzle closing valve according to claim 15, which comprises a metallic collar positioned between the membrane and the second spring.

17. A nozzle closing valve according to claim 15, wherein the first spring comprises a coil spring and acts on a thrust bolt, the thrush bolt having an end face which exerts pressure on the membrane.

18. A nozzle closing valve according to claim 17, wherein the end face of the thrust bolt is convexly shaped.

19. A nozzle closing valve according to claim 17, wherein a displacement path of the thrust bolt is limited in a valve opening direction.

20. A nozzle closing valve according to claim 15, wherein a filter is placed at the inlet part.

21. A nozzle closing valve according to claim 20, wherein said filter is made from sintered metal.

22. A nozzle closing valve according to claim 20, wherein:
   the nozzle closing valve comprises rotationally symmetrical components arranged concentrically to a valve axis, the components surrounding a cylindrical ring-shaped valve casing which is closed on one side by a fixed fitted filter;
   an inner part is inserted in the valve casing, the inner part containing the inlet passage as a lateral recess, the inner part being supported on an inlet side on the filter and containing the spring chamber and the membrane seat connected thereto;
   a valve screw is screwed in the valve casing, the valve screw containing the outlet passage as a central bore, the valve screw being equipped on an inlet side with the valve seat and in a screwed in state fixing the inner part in the valve casing; and
   the valve casing has an external thread with which the valve casing is screwable into the pressure atomizer nozzle.

23. A nozzle closing valve according to claim 22, wherein the valve screw is sealed by an O-ring against the valve casing.

24. A nozzle closing valve according to claim 20, further comprising:
   a cylindrical ring-shaped valve casing which is closed on one side by a filter;
   an inner part inserted in the valve casing and containing the inlet passage, the inner part being supported on an inlet side on the filter and containing the spring chamber and the membrane seat connected thereto;
   a valve screw screwed in the valve casing, the valve screw containing the outlet passage, the valve screw being equipped on an inlet side with the valve seat and in a screwed in state fixing the inner part in the valve casing; and
   an external thread on the valve casing which permits the valve casing to be screwed into a pressure atomizer nozzle.

25. A pressure atomizer nozzle for an oil burner, said pressure atomizer nozzle comprising:
   a nozzle casing which separates an inner space in the form of a blind hole from an outer space, said inner space being connected in a base region of the blind hole by a nozzle bore to the outer space, wherein in the inner space is inserted a nozzle closing valve, said nozzle closing valve comprising:
   an inlet having an inlet passage;
   an outlet having an outlet passage;
   a valve seat located between the inlet passage and the outlet passage; and
   a shutoff member which is pressed by a first spring positioned behind said shutoff member in a sealing manner onto said valve seat and rises from said valve seat counter to a force of the first spring when a predetermined pressure is reached in the inlet;
   wherein:
     said shutoff member comprises a membrane;
     the first spring has a substantially linear spring characteristic and is housed in a spring chamber, the spring chamber being constructed as a closed space with only one opening on one side, said opening being sealingly closed by the membrane;
     the first spring and the spring chamber are located in the inlet of the nozzle closing valve; and wherein the opening of the spring chamber is bordered by a circumferential membrane seat, on which rests a rear marginal area of the membrane, and the membrane is pressed by a second spring against the membrane seat.

26. A pressure atomizer nozzle according to claim 25, wherein the nozzle closing valve is screwed into the nozzle casing and is sealed against the nozzle casing with an O-ring.

27. A pressure atomizer according to claim 25, wherein between the nozzle closing valve and the nozzle bore, a conical insert is placed in the inner space of the nozzle casing.

* * * * *

UNITED STATES PATENT AND TRADEMARK OFFICE
CERTIFICATE OF CORRECTION

PATENT NO. : 5,890,658
DATED : April 6, 1999
INVENTOR(S) : Marcel CAMINADA

It is certified that error appears in the above-identified patent and that said Letters Patent is hereby corrected as shown below:

On the Title page, item [30] should be:

--[30]      Foreign Application Priority Data
       May 3, 1996   [CH]   Switzerland ........... 1139/96--

Signed and Sealed this

First Day of February, 2000

Attest:

Q. TODD DICKINSON

*Attesting Officer*      *Acting Commissioner of Patents and Trademarks*